US012549459B2

(12) United States Patent
Vasseur et al.

(10) Patent No.: US 12,549,459 B2
(45) Date of Patent: Feb. 10, 2026

(54) APPLICATION QOE COMPARATIVE ANALYTICS FOR REMOTE VERSUS IN-OFFICE USERS

(71) Applicant: Cisco Technology, Inc., San Jose, CA (US)

(72) Inventors: Jean-Philippe Vasseur, Combloux (FR); Grégory Mermoud, Venthône (CH); Eduard Schornig, Haarlem (NL); Pierre-André Savalle, Rueil-Malmaison (FR); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 18/197,488

(22) Filed: May 15, 2023

(65) Prior Publication Data

US 2024/0388513 A1 Nov. 21, 2024

(51) Int. Cl.
*H04L 41/5067* (2022.01)
*H04L 41/147* (2022.01)
*H04L 41/16* (2022.01)

(52) U.S. Cl.
CPC ........ *H04L 41/5067* (2013.01); *H04L 41/147* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 10,630,808 B1* | 4/2020 | Watt | H04L 67/63 |
| 2017/0116552 A1 | 4/2017 | Deodhar et al. | |
| 2018/0232680 A1 | 8/2018 | Hazime et al. | |
| 2021/0010816 A1 | 1/2021 | Schmelzer et al. | |
| 2022/0036265 A1 | 2/2022 | Yang et al. | |
| 2022/0131779 A1* | 4/2022 | Chawla | H04L 41/5064 |
| 2022/0400065 A1 | 12/2022 | Cioffi et al. | |
| 2023/0239343 A1* | 7/2023 | Ge | H04L 67/10 709/203 |

\* cited by examiner

*Primary Examiner* — Angela Nguyen
(74) *Attorney, Agent, or Firm* — Lee & Hayes, P.C.

(57) ABSTRACT

In one embodiment, a device maps network addresses associated with a user to a plurality of geographical locations, at least one of which is an office location of an enterprise. The device obtains quality of experience metrics for an online application accessed by the user. The device makes, based on the quality of experience metrics, a determination as to whether the office location of the enterprise would afford better application experience to the user. The device provides an indication of the determination for display.

20 Claims, 10 Drawing Sheets

| OFFICE 602 | LOCATION 604 | PUBLIC IP RANGES 606 | LOCAL IP RANGES 608 | VPN IP RANGES 610 |
|---|---|---|---|---|
| Office1 | Poland/Krakow | 85.12.0.0/16 | 10.10.16.0/20 | 10.10.12.0/24 |
| Office2 | France/Paris | 92.12.5.0/24 | 10.10.100.0/24<br>10.10.101.0/24 | 10.10.101.128/25 |
| Office3 | UK/London | 95.12.3.0/27 | 10.10.102.0/24 | - |

FIG. 6A

| USER 622 | TIMESTAMP 624 | LOCATION 626 | PUBLIC IP 628 | LOCAL IP 630 | VPN IP 632 |
|---|---|---|---|---|---|
| User1 | 2023-03-03<br>11:30 UTC | Poland/Warsaw | 1.2.3.4 | 192.168.1.9 | - |
| User1 | 2023-03-04<br>12:30 UTC | Poland/Krakow | 85.12.1.1 | 10.10.100.5 | - |
| User1 | 2023-03-05<br>13:30 UTC | Poland/Krakow | 85.12.1.1<br>(5.5.5.5) | 192.168.2.16 | 10.10.101.134 |
| User2 | 2023-03-03<br>11:30 UTC | France/Paris | 7.7.7.7 | 10.1.1.15 | - |

FIG. 6B

APPLICATION QOE COMPARATIVE ANALYTICS FOR REMOTE VERSUS IN-OFFICE USERS

TECHNICAL FIELD

The present disclosure relates generally to computer networks, and, more particularly, to application quality of experience (QoE) comparative analytics for remote versus in-office users.

BACKGROUND

In recent years, remote work options, such work-from-home and hybrid work options, have grown considerably in popularity. For such setups to be effective, though, the quality of experience (QoE) for the various online applications accessed by a remote worker needs to be at an acceptable level. Indeed, the productivity of most remote workers is directly a function of the quality of experience provided by the various online applications that they use. For instance, a videoconferencing application that keeps freezing on a remote worker may greatly impact their ability to perform their work duties.

To date, there is very little visibility into the application QoE experienced by remote workers. Indeed, unlike a worker that is in the office where the configuration of the network is known and heavily monitored, there may be any number of factors that affect the QoE that are beyond the control of an enterprise network administrator, such as the type of network connection used by the remote worker, the configuration of their home network, etc. Consequently, there is no real way to determine whether any given worker will experience better application QoE in the office or at a remote location.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate example mappings of user locations; and

DESCRIPTION OF EXAMPLE EMBODIMENTS

Overview

Figure 1A:
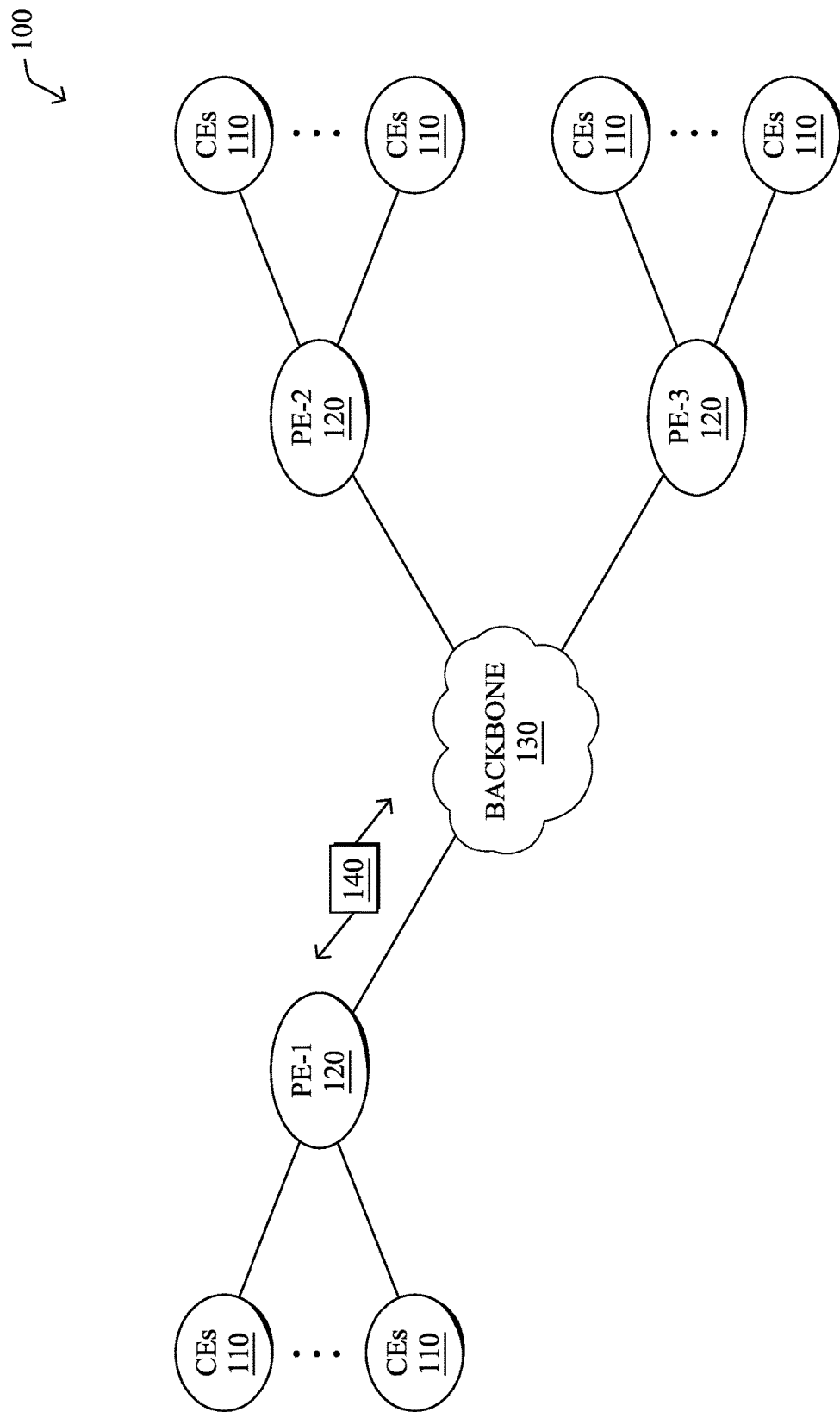
FIGS. 1A-1B illustrate an example communication network.

According to one or more embodiments of the disclosure, a device maps network addresses associated with a user to a plurality of geographical locations, at least one of which is an office location of an enterprise. The device obtains quality of experience metrics for an online application accessed by the user. The device makes, based on the quality of experience metrics, a determination as to whether the office location of the enterprise would afford better application experience to the user. The device provides an indication of the determination for display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
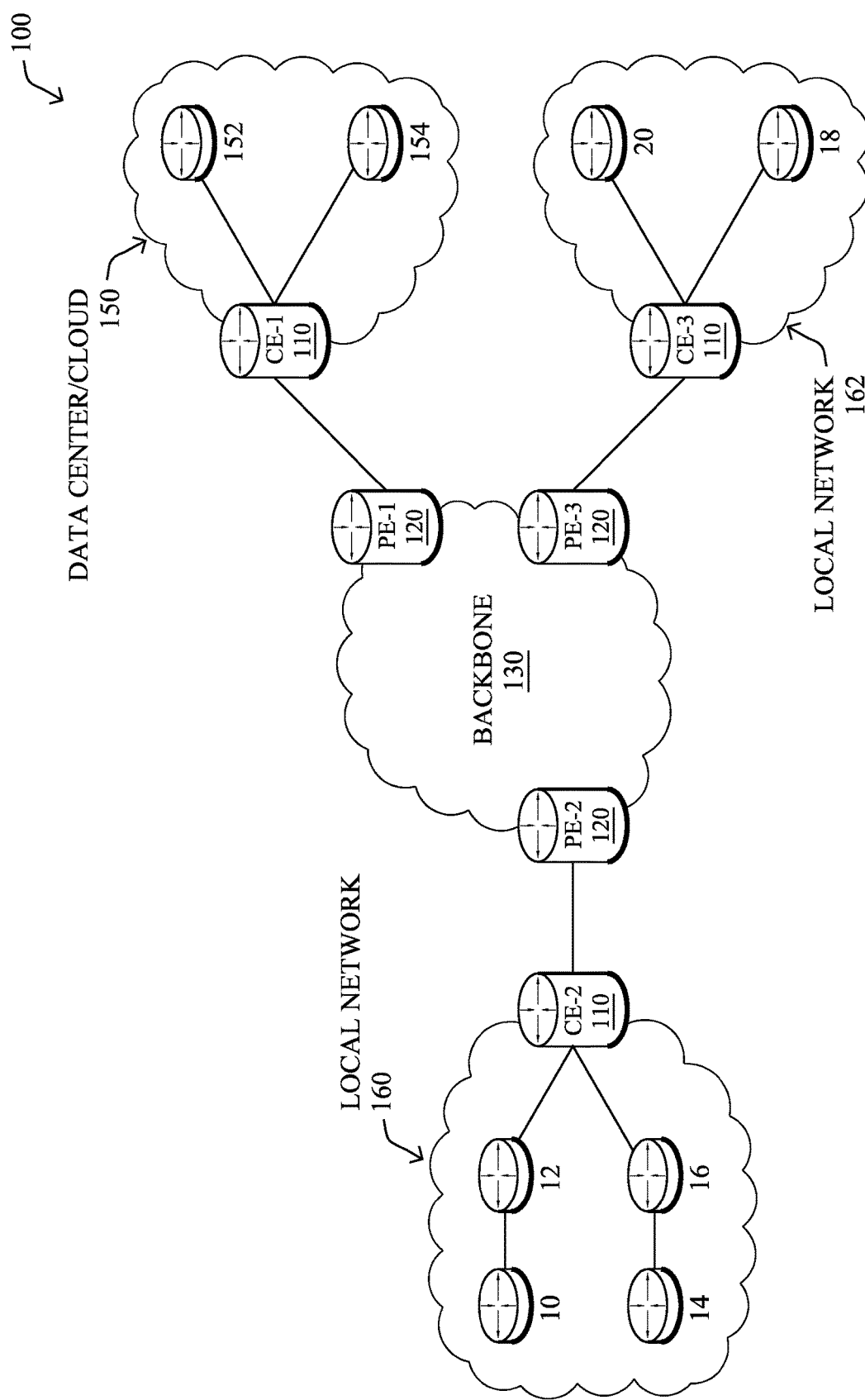

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
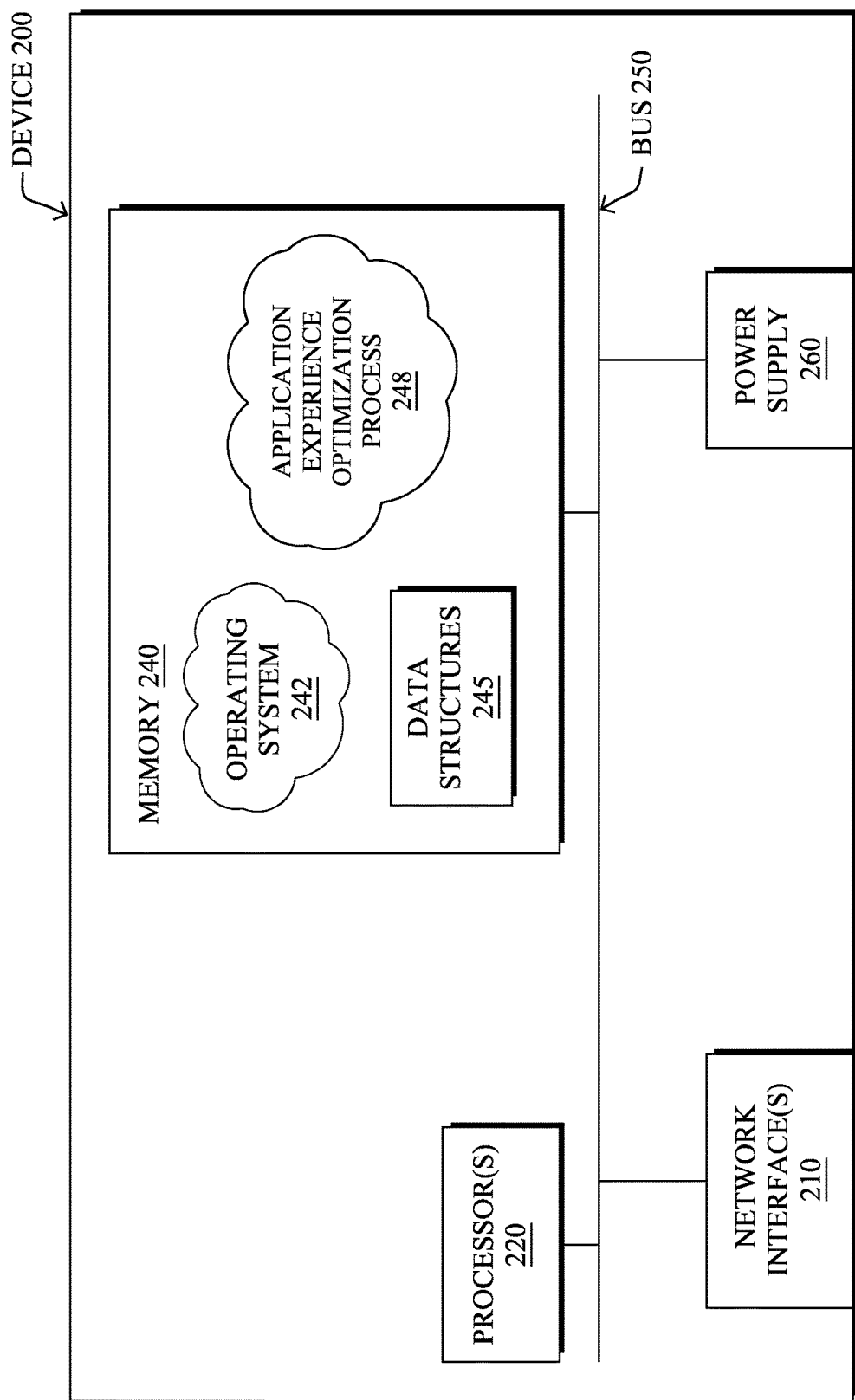
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
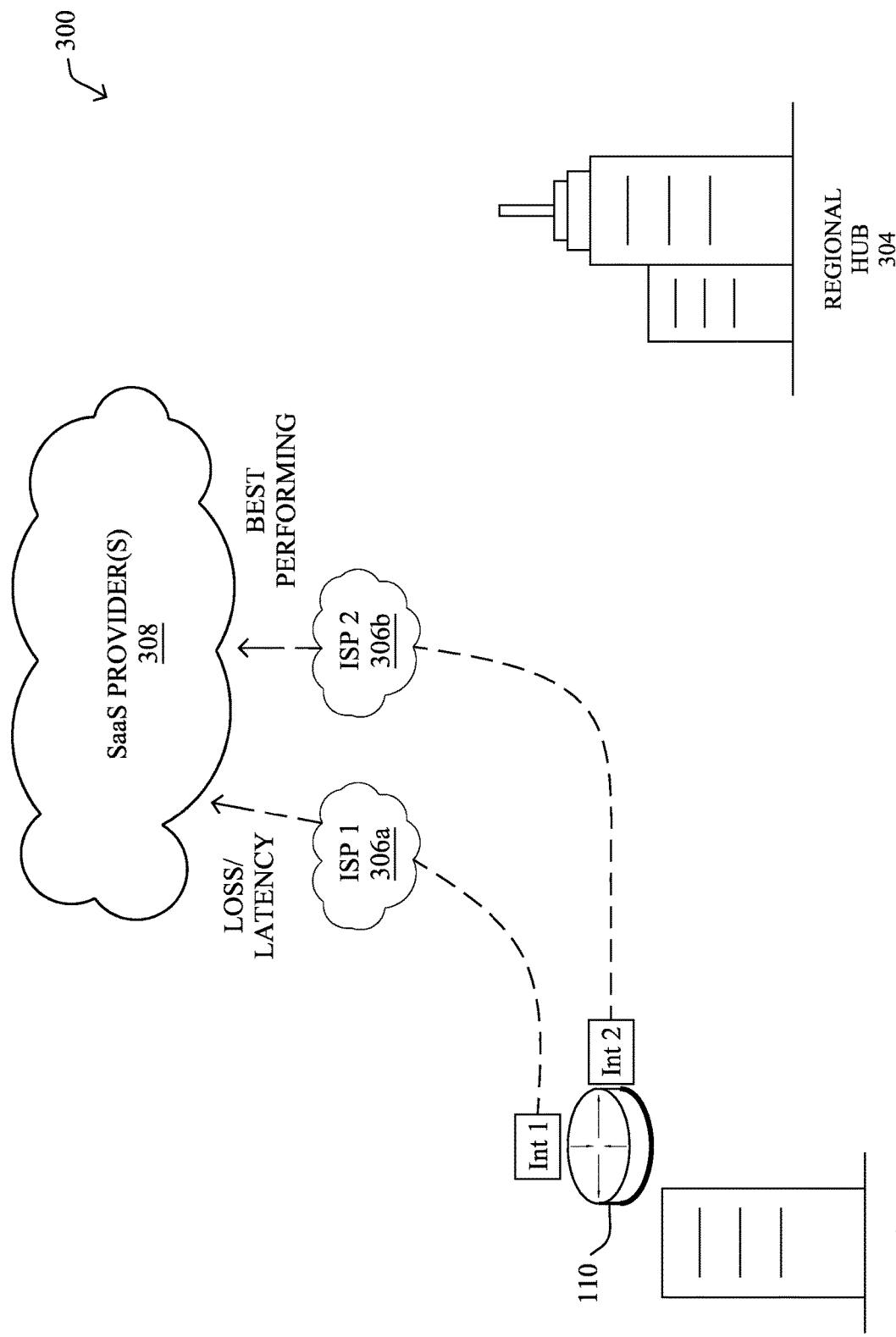
FIGS. 3A-3B illustrate example network deployments.
Figure 3B:
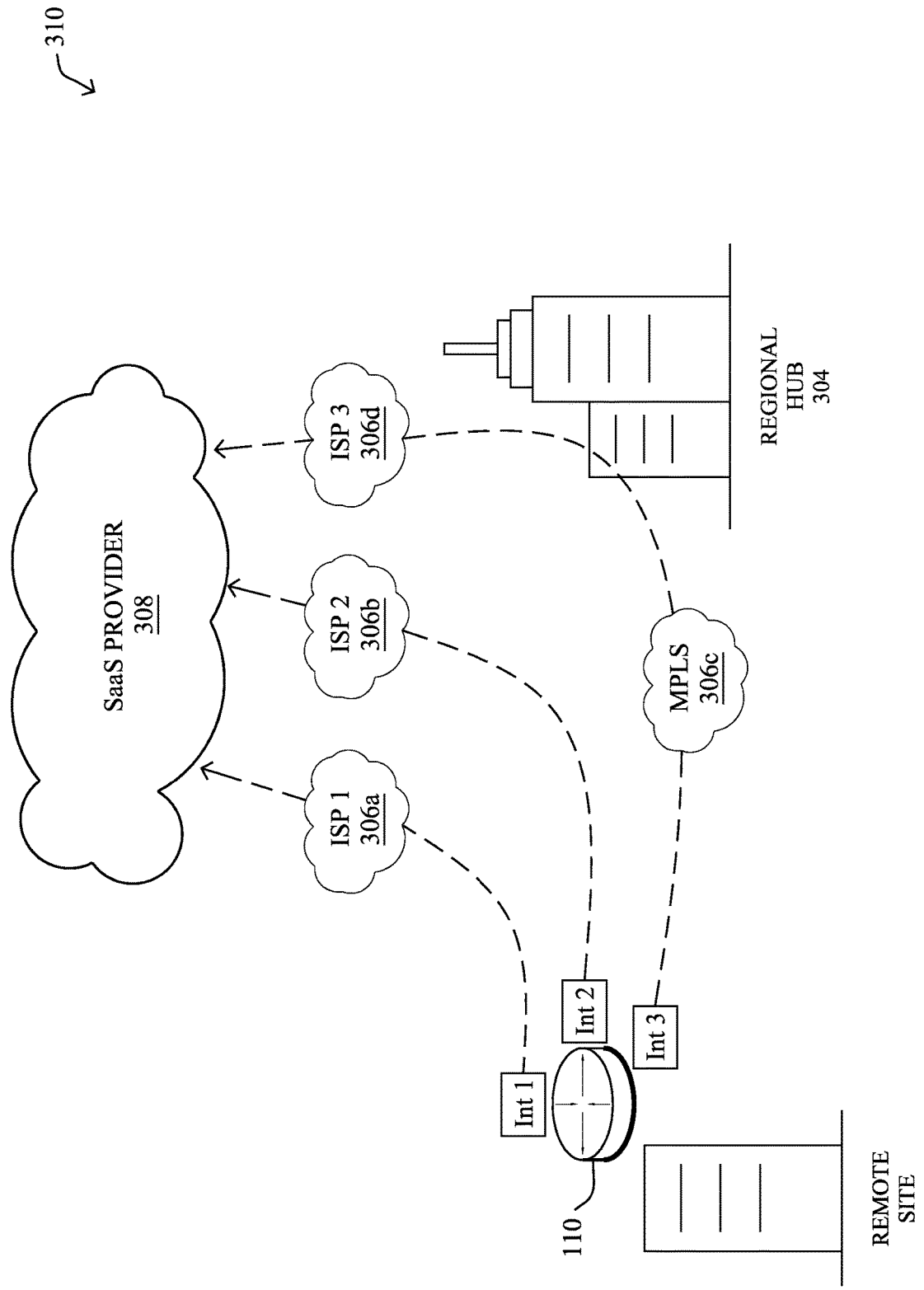

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
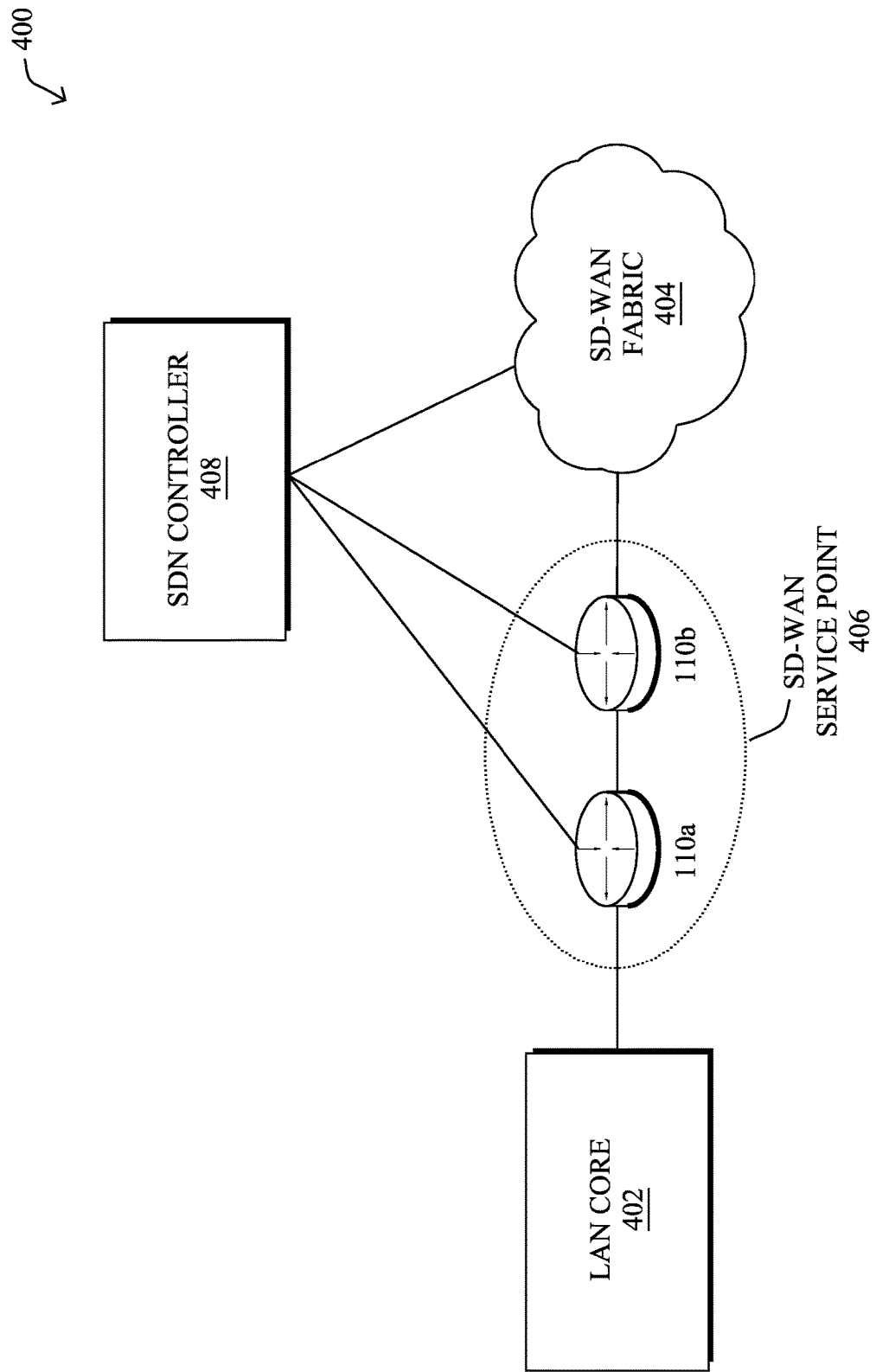
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
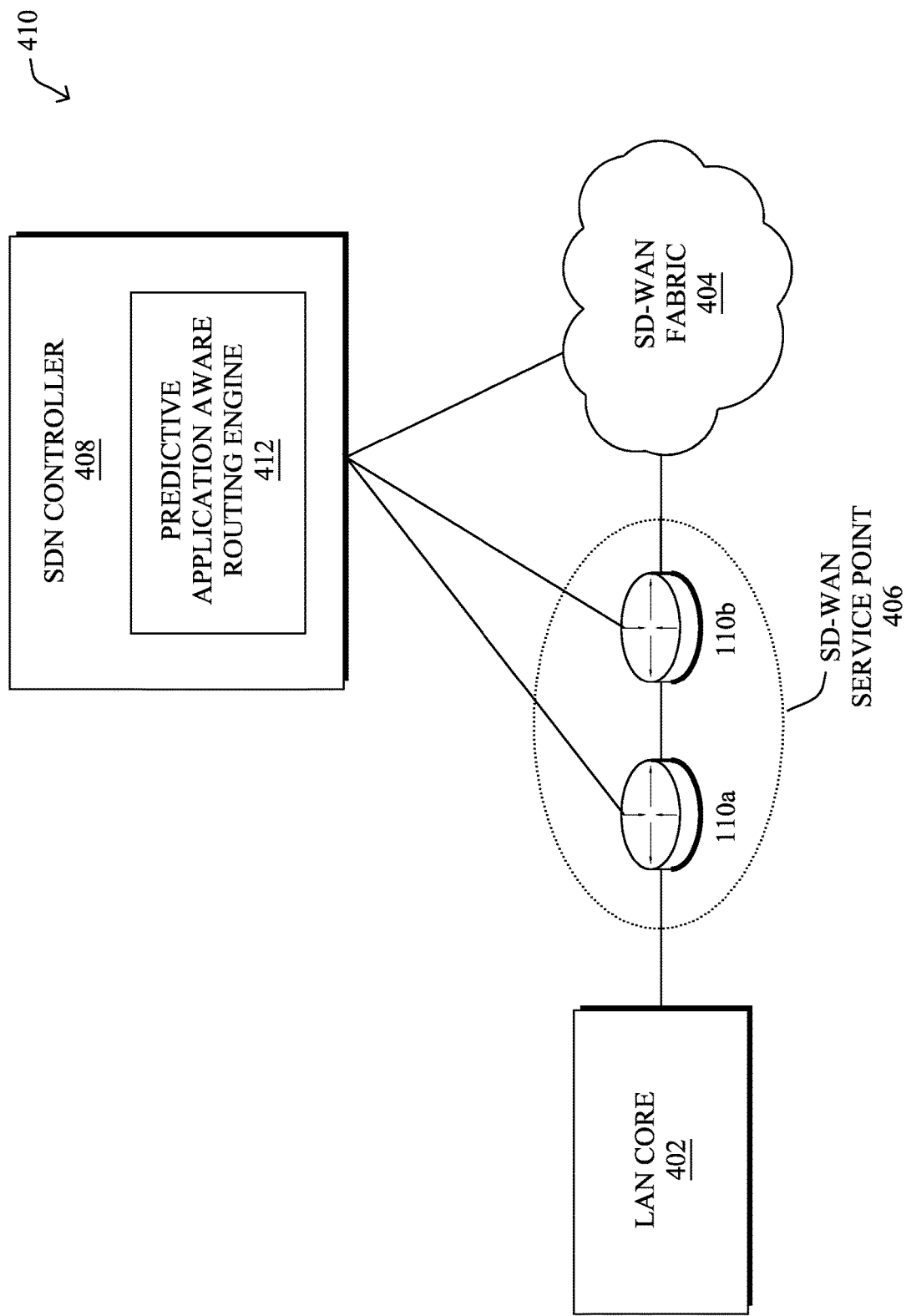

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

Since the COVID-19 pandemic, many enterprises are facing the challenge of bringing their employee back to the office, at least for a few days a week. This raises the main challenge of determining whether the application experience users face from home is better (or worse) than the one when working from the office. As of today, there are no tools available that allow for comparing user experiences when working remotely versus in the office.

——Application QoE Comparative Analytics for Remote Versus In-Office Users——

The techniques introduced herein allow for the evaluation of how the decision to work remotely versus in the office has on the QoE of a given online application. In some aspects, the techniques herein first identify the location of a user, be it from in the office or at a remote location, such as their home. In turn, a series of QoE metrics are obtained for the application of interest (e.g., as forecast by a cognitive network machine learning model), allowing for the system to compare the effects of the different locations. In addition, in some aspects, the techniques herein also allow for the identification of the subset of users with the most significant difference in predicted QoE metrics and ask those users to verify the difference in terms of their user experiences. Finally, the techniques herein also allow for suggesting or making changes, to increase the user experience of a remote worker, so as to be as close as possible to the experience that they would have from the office.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device maps network addresses associated with a user to a plurality of geographical locations, at least one of which is an office location of an enterprise. The device obtains quality of experience metrics for an online application accessed by the user. The device makes, based on the quality of experience metrics, a determination as to whether the office location of the enterprise would afford better application experience to the user. The device provides an indication of the determination for display.

Figure 5:
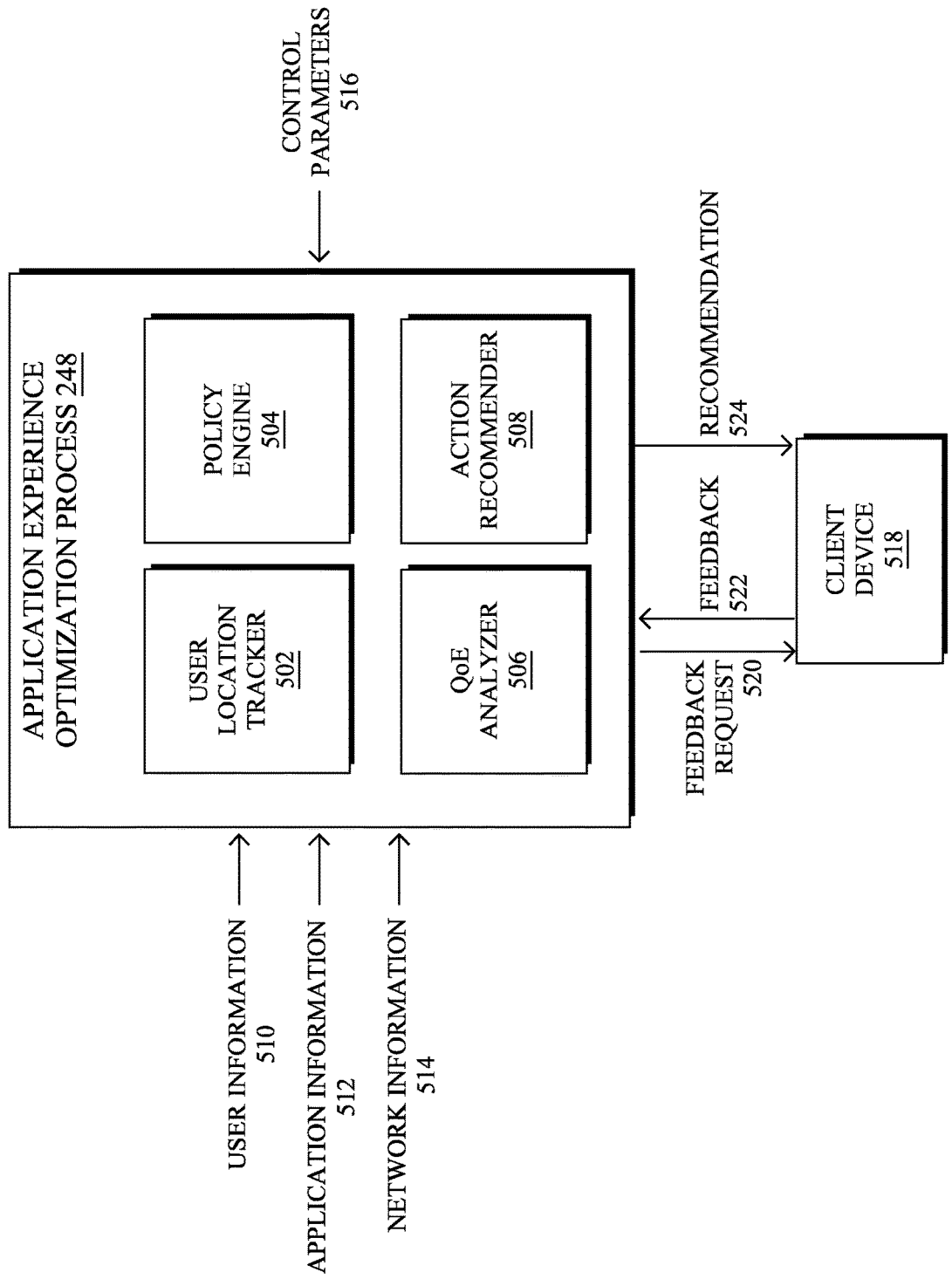
FIG. 5 illustrates an example architecture for application quality of experience (QoE) comparative analytics for remote versus in-office users.

Operationally, FIG. 5 illustrates an example architecture for application quality of experience (QoE) comparative analytics for remote versus in-office users, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network. In further embodiments, application experience optimization process 248 may be used to provide a recommendation service to client devices in a network, such as client device 518.

As shown, application experience optimization process 248 may include any or all of the following components: user location tracker 502, policy engine 504, QoE analyzer 506, and/or action recommender 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During execution, application experience optimization process 248 may operate in conjunction with any number of telemetry collection mechanisms, to obtain various information, such as user information 510, application information 512, and/or network information 514. As detailed below, such telemetry collection mechanisms may include, but are not limited to, network path probing mechanisms, user account information, the QoE collection/surveying mechanisms, the online applications themselves (e.g., via application programming interfaces of the applications), and the like.

In general, user information 510 may include any information about the plurality of users of an online application. For instance, user information 510 may be available from a human resources (HR) service, account information from the online application, network account information, combinations thereof, or the like. In various embodiments, user information 510 may include any or all of the following:

Location information for the user—e.g., the city, zip code, metropolitan area, country, coordinates, address, etc.

The type of uplink(s) available to the user—e.g., service providers, network types (e.g., cellular, fiber, etc.), Wi-Fi SSIDs, and the like.

Information regarding the user's client device—e.g., device type, device resources (e.g., CPU and memory usage of applications), software installed, software currently running, the user's permission level (e.g., whether they have administrator privileges), etc. Such information could be gathered, for instance, through the execution of a local agent (e.g., Duo Device Health) or from the operating system of the client device (e.g., iOS, Android, etc.).

Information regarding the local network of the user—e.g., their router, IP tables, etc.

Any other information regarding the user, their client device, and/or the network that they use to access the online application.

Application information 512 may include any telemetry data available from the online application (e.g., Layer 7 information) that could be used to predict the QoE metrics of its users. For instance, application information 512 may include concealment times, mean opinion score (MOS) information, or other such application-level information. In some embodiments, application information 512 may even include ratings provided by the users themselves, such as survey data regarding how satisfied users of the application are with their experiences. In additional embodiments, application information 512 may also include telemetry captured by an application and performance monitoring (APM) solution, such as Datadog, AppDynamics, or the like.

Network information 514 may generally include any network-level (e.g., Layer 3) telemetry data that could be used to predict the QoE metrics for users of the online application. For instance, network information 514 may include path metrics regarding the various network paths (e.g., DIA paths, tunnels, etc.) used to access the online application. For instance, network metrics may be obtained by sending probes along the various paths/tunnels, such as Bidirectional Forwarding Detection (BFD) or CXP probes, that indicate path metrics such as loss, latency, jitter, throughput, etc. Netflow or IPFIX records represent another potential source of network information 514. In addition, network information 514 may also include state information for the various networking devices (e.g., queue states, hardware resources, etc.) associated with those network paths.

Example sources for network information 514 may include, but are not limited to, network controllers (e.g. vManage, Cisco DNA, Meraki, etc.), path probing mechanisms (e.g., ThousandEyes), client-side sensors (e.g., AnyConnect), or the like.

In various embodiments, user location tracker 502 may be configured to determine whether a user is working remotely or from the office. To do so, user location tracker 502 may initially map the office location(s) of an enterprise to geographical location(s) and ranges of associated public and/or local IP addresses.

In other instances, user location tracker 502 may do so based on data manually specified by a network administrator. In other instances, user location tracker 502 may construct such a mapping automatically based on user information 510, application information 512, and/or network information 514. For instance, user location tracker 502 may do so integrations with IP address manager (IPAM) solutions or others like Cisco DNA Center (providing local IP addresses for each office location), or Viptela SD-WAN (providing public IP addresses for each office location). VPN concentrators like Cisco ASA can also provide the details on the IP ranges allocated for remote VPN users terminated in each office, when they support terminating VPN sessions.

Consequently, user location tracker 502 may construct a mapping such as mapping 600 show in FIG. 6A. As shown, mapping 600 may relate different offices 602, to their locations 604, public IP ranges 606, local IP ranges 608, and/or VPN IP ranges.

In various embodiments, user location tracker 502 may also produce a similar mapping for different users that tracks changes to their locations and IP addresses with respect to time, such as mapping 620 shown in FIG. 6B. As shown, mapping 620 may relate user identifiers 622, with timestamps 624, locations 626, public IP addresses 628, local IP addresses 630, and/or VPN IP addresses 632. For instance, user location tracker 502 may obtain the user identifiers (e.g., their name, email, other identifier) along with their public, local, and/or VPN IP addresses from authorization solutions like Cisco Identity Services Engine (ISE) or endpoint solutions like ThousandEyes Endpoint Agent, or the Cisco AnyConnect VPN client running on the corporate PC (and/or Cisco DNA Center/SDWAN).

Thus, as shown in FIG. 6B, User1 could be mapped to:

A remote location in Poland/Warsaw (without VPN) from 2023-03-03 11:30 UTC.

A local presence in Office1 in Krakow (as both public and local IPs for the user are a match for Office1), from 2023-03-04 12:30 UTC.

Back to a remote location in Poland/Krakow, with VPN enabled to Office1 from 2023-04-05 13:30 UTC. The user's local IP does not match any office, but the IP assigned by the VPN gateway matches Office1, and egress traffic is sent via Office1, with a public IP (85.12.1.1) belonging to that office. At the same time, the real public IP address used to build the VPN connection (5.5.5.5) is commonly used and suggests it is User1's home.

This way, all the users can be mapped to a status of "Office," "Remote," and/or "Remote with VPN," at any given point in time. User location tracker 502 may also rank the remote locations based on frequency of usage and potentially leverage heuristics to exclude Remote locations that do not correspond to the user's home (e.g., if the user is traveling). Doing so would allow user location tracker 502 to map the users to location categories of Office, Home, or Home with VPN, respectively.

User location tracker 502 may also support other, more complex connectivity cases, as well. For example, various VPN split tunneling policies might be supported where only a fraction of the traffic is sent over the VPN via the Office, while the rest of the traffic is sent directly to the Internet. In such a case, the mapping of the Office/Home/Home with VPN statuses for each user and point in time is may also be application dependent.

In various embodiments, policy engine 504 may be configured to determine the scope and the QoE metrics to use for comparative analytics. To this end, policy engine 504 may allow a system administrator to specify control parameters 516, such as any or all of the following:

- The list of applications for which comparative analytics is of interest (e.g., internal applications, SaaS applications such as Webex, Microsoft O365, Workday, etc.)
- The regions and/or users of interest: the study may be limited to some regions or specific user profiles (e.g., engineering, sales, etc.).
- The QoE performance metrics: in some cases, applications have their own performance metrics (e.g., Cisco Webex User Experience, Microsoft Call Quality Dashboard, etc.), whereas for other applications such metrics simply do not exist. An alternative is to use a tool capable of generating probes according to pre-configured synthetic tests (e.g., ThousandEyes) that can then be used to record raw performance metrics (e.g., time to load a web page) or map to composite scores based on multiple such raw metrics (e.g., as in Cisco DNA, which computes application health scores using polynomial functions). Yet another approach consists in using a QoE machine learning model that has been trained to compute a QoE score according to various network/application metrics.

QoE analyzer 506 may charge of comparing a set of QoE metrics for the applications/users of interest when working remotely (e.g., from home), as opposed to from the office. To do so, QoE analyzer 506 may build a dataset for each application, and each location status (i.e., Office, Remote, or Remote with VPN). Each dataset may then include QoE metrics for users and timestamps corresponding to the application and location status, and comparing these datasets allows QoE analyzer 506 to compare the effects of the different locations on the application experiences. In some embodiments, QoE analyzer 506 may make the comparisons in accordance with any policies defined via policy engine 504 (e.g., compare for users in Engineering located in India, or for Sales employees using a CRM application C based in Europe, etc.).

In one embodiment, QoE analyzer 506 may take into account all available data points (i.e., all the QoE metrics computed every x minutes). However, in another embodiment, it may only consider specific statistical moments such as the mean, median, or percentiles instead of full time series. A statistical test can be used to assess whether the experience is different. For example, a two-sample test can be used with a Null Hypothesis formulated as "There is no statistical difference in terms of QoE for a given application when working from home or the office." However, the distributions can differ without a significant difference in quality-of-experience: for instance, assuming a QoE metric between 1 (poor) and 5 (perfect), the two populations may both have metric values supported over [4, 5] (i.e., all scores are satisfying), although the precise shape of the distributions may differ. As a consequence, other tests and formulations may be needed, depending on the context, such as which QoE metrics are being used.

In another embodiment, QoE analyzer 506 may cluster users per sub-regions of a parent geographical region of interest (e.g., comparing QoE for Remote vs Office for all users in the United States and plot results per state) or even per group of users. Indeed, it may be possible to find statistical difference only for some group of users or users in a given region whereas such difference cannot be observed for other group. In this case, QoE analyzer 506 may automatically try to find such groups for which there is a statistical difference between home versus office in terms of QoE for the applications of interest and related metrics. Another criterion may be the nature of the service provider connection. For instance, users having unreliable service provider access from home may be more likely to experience a significant difference in QoE when working from the office, in which case QoE analyzer may be able to provide a statistical analysis on the related QoE based on the service provider access type used from home. Such analysis may be manual or automated with the objective of determining the set of users for whom the difference in QoE between home and work office is the highest.

In some embodiments, QoE analyzer 506 may also obtain feedback from users for whom the analysis by QoE analyzer 506 indicated a significant QoE difference between locations. In such case, QoE analyzer 506 may send a feedback request 520 to a client device 518 of a user at which an agent, bot, or even an in-application function may enter into a monitoring state and solicit feedback 522 from a given user while at the different locations (e.g., at home, in the office, etc.). For instance, feedback 522 may take the form of a QoE rating or other metric indicative of the user's subjective satisfaction with a given online application or set of applications. In turn, client device 518 may then provide the resulting feedback 522 to QoE analyzer 506, to confirm whether the percentage of good/poor experiences is significantly different.

QoE analyzer 506 may also provide its analysis of the effects of the different locations on the QoE, and potentially its analysis of feedback 522 as well, to a network administrator and/or affected users for review. QoE analyzer 506 may perform such automatic analysis for a sampled subset of the users of interest both for groups where it is believed that there is no significant difference and, conversely for groups of users for whom the analysis seems to show a significant difference. In another embodiment, users may be informed of the difference in terms of QoE along with the probable root cause (e.g., "you seem to have a quality-of-experience that is X % lower when working from home, because your uplink from home is low speed or experience high rate of errors, etc.).

In some embodiments, action recommender 508 may also generate recommendations for users experiencing a lower user experience at home and see whether they could take any actions to help close the gap with the QoE available from the office location. For instance, as shown, action recommender 508 may send recommendation 528 to client device 518 with a suggested action to the user to help improve their QoE when working from home.

Indeed, there may be a number of configuration changes that could be applied to a home networking environment that can have a drastic influence on the user experience. For example, the path selection (using Wifi, 4G uplink), QoS applied to the SP facing link, use of a VPN to steer traffic destined to some (SaaS) applications as opposed to use the Direct Internet Access, etc. Here, the aim of action recommender 508 is to recommend specific changes so as to potentially get closer to the QoE experience when working from the office. It may also be possible to determine whether the most optimal strategy is in place for the remote worker and, if not, recommend such a strategy. Of course, if action recommender 508 is unable to device an optimal strategy, it could also recommend and/or trigger various configuration changes and then seek explicit feedback 522, in order to see whether the user experience from home or other remote location gets closer to that offered in the office.

Figure 7:
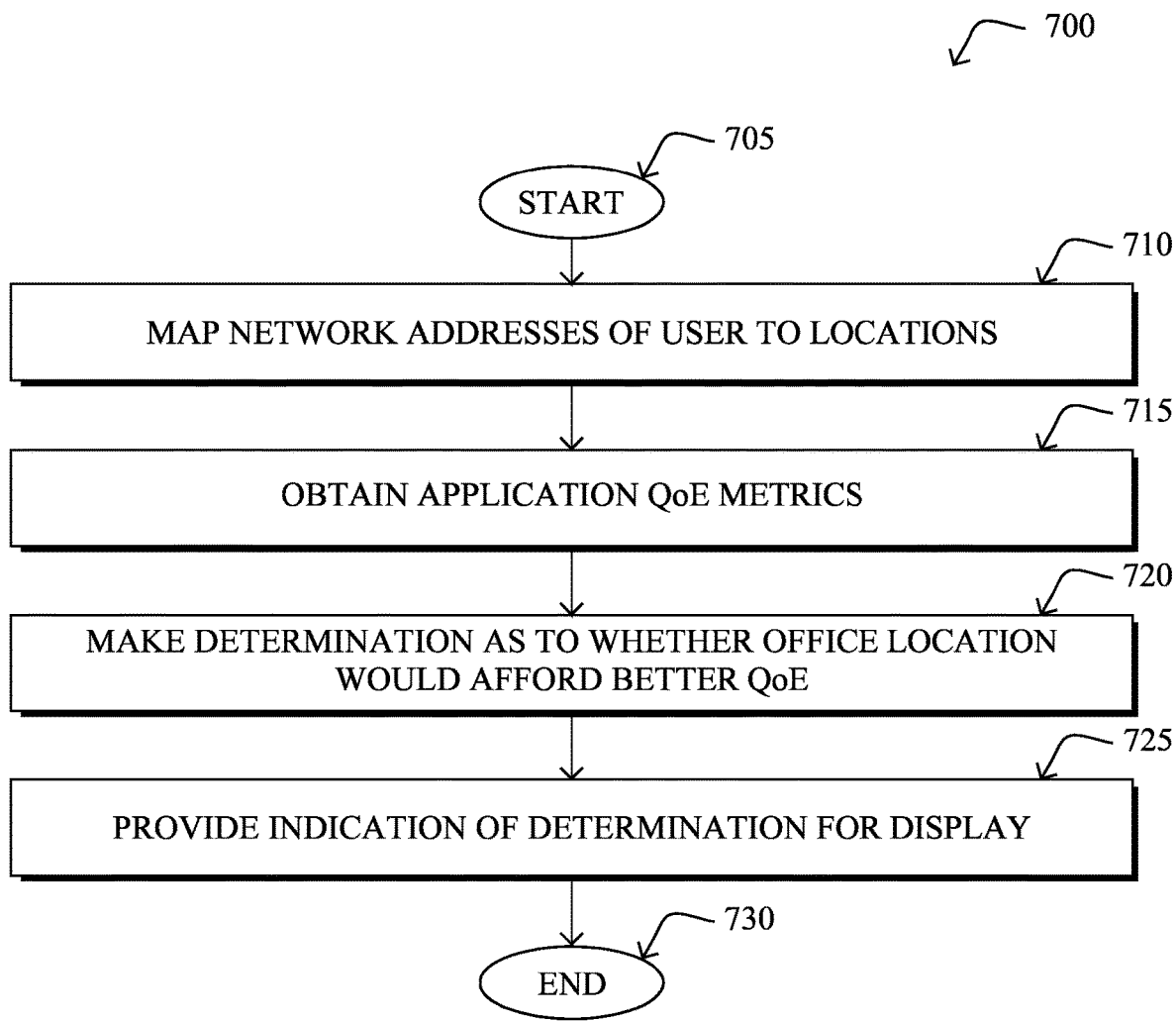
FIG. 7 illustrates an example simplified procedure for performing application QoE analytics for remote versus in-office users.

FIG. 7 illustrates an example simplified procedure for performing application QoE analytics for remote versus in-office users, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 700 by executing stored instructions (e.g., application experience optimization process 248). The procedure 700 may start at step 705, and continues to step 710, where, as described in greater detail above, the device may map network addresses associated with a user to a plurality of geographical locations, at least one of which is an office location of an enterprise. In various embodiments, the device may map the network addresses associated with the user to the plurality of geographical locations based in part on a public range of network addresses and a local range of network addresses associated with the office location. In one embodiment, the office location is further associated with a Virtual Private Network (VPN) range of network addresses. In one embodiment, the device selects the user based on a specified region in which at least one of the plurality of geographical locations is located (e.g., based on a policy set by a network administrator).

At step 715, as detailed above, the device may obtain quality of experience metrics for an online application accessed by the user. In some embodiments, the quality of experience metrics are generated at least in part by sending synthetic probes to the online application. In another embodiment, the quality of experience metrics are generated at least in part by a machine learning-based prediction model. In a further embodiment, the device obtains the quality of experience metrics from the online application. In some embodiments, the quality of experience metrics are associated with different users than that of the user.

At step 720, the device may make, based on the quality of experience metrics, a determination as to whether the office location of the enterprise would afford better application experience to the user, as described in greater detail above.

At step 725, as detailed above, the device may provide an indication of the determination for display. In some embodiments, the device may also provide a recommended configuration change for a home network of the user, when the determination indicates that the office location of the enterprise would afford a better application experience to the user. In yet another embodiment, the device may also solicit feedback from the user regarding their experience with the online application while the user is located at a particular geographical location, based on the determination.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for performing application QoE analytics for remote versus in-office users, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    mapping, by a device, network addresses associated with a user to a plurality of geographical locations, at least one of which is an office location of an enterprise;
    obtaining, by the device, quality of experience metrics for an online application accessed by the user;
    making, by the device and based on the quality of experience metrics, a determination as to whether the office location of the enterprise would afford better application experience to the user; and
    providing, by the device, an indication of the determination for display.

2. The method as in claim 1, wherein the quality of experience metrics are generated at least in part by sending synthetic probes to the online application.

3. The method as in claim 1, wherein the quality of experience metrics are generated at least in part by a machine learning-based prediction model.

4. The method as in claim 1, wherein the device obtains the quality of experience metrics from the online application.

5. The method as in claim 1, further comprising:
    providing, by the device, a recommended configuration change for a home network of the user, when the determination indicates that the office location of the enterprise would afford a better application experience to the user.

6. The method as in claim 1, wherein the device maps the network addresses associated with the user to the plurality of geographical locations based in part on a public range of network addresses and a local range of network addresses associated with the office location.

7. The method as in claim 6, wherein the office location is further associated with a Virtual Private Network (VPN) range of network addresses.

8. The method as in claim 1, wherein the quality of experience metrics are associated with different users than that of the user.

9. The method as in claim 1, further comprising:
soliciting feedback from the user regarding their experience with the online application while the user is located at a particular geographical location, based on the determination.

10. The method as in claim 1, wherein the device selects the user based on a specified region in which at least one of the plurality of geographical locations is located.

11. An apparatus, comprising:
one or more network interfaces;
a processor coupled to the one or more network interfaces and configured to execute one or more processes; and
a memory configured to store a process that is executable by the processor, the process when executed configured to:
map network addresses associated with a user to a plurality of geographical locations, at least one of which is an office location of an enterprise;
obtain quality of experience metrics for an online application accessed by the user;
make, based on the quality of experience metrics, a determination as to whether the office location of the enterprise would afford better application experience to the user; and
provide an indication of the determination for display.

12. The apparatus as in claim 11, wherein the quality of experience metrics are generated at least in part by sending synthetic probes to the online application.

13. The apparatus as in claim 11, wherein the quality of experience metrics are generated at least in part by a machine learning-based prediction model.

14. The apparatus as in claim 11, wherein the apparatus obtains the quality of experience metrics from the online application.

15. The apparatus as in claim 11, wherein the process when executed is further configured to:
provide a recommended configuration change for a home network of the user, when the determination indicates that the office location of the enterprise would afford a better application experience to the user.

16. The apparatus as in claim 11, wherein the apparatus maps the network addresses associated with the user to the plurality of geographical locations based in part on a public range of network addresses and a local range of network addresses associated with the office location.

17. The apparatus as in claim 16, wherein the office location is further associated with a Virtual Private Network (VPN) range of network addresses.

18. The apparatus as in claim 11, wherein the quality of experience metrics are associated with different users than that of the user.

19. The apparatus as in claim 11, wherein the process when executed is further configured to:
solicit feedback from the user regarding their experience with the online application while the user is located at a particular geographical location, based on the determination.

20. A tangible, non-transitory, computer-readable medium storing program instructions that cause a device to execute a process comprising:
mapping, by the device, network addresses associated with a user to a plurality of geographical locations, at least one of which is an office location of an enterprise;
obtaining, by the device, quality of experience metrics for an online application accessed by the user;
making, by the device and based on the quality of experience metrics, a determination as to whether the office location of the enterprise would afford better application experience to the user; and
providing, by the device, an indication of the determination for display.

* * * * *